J. R. Leschot.
Rock Drill.

No. 3690 Reissued Oct. 26. 1869.

Witnesses:
J. W. Coombs
G. W. Reed

Inventor:
J. R. Leschot
per Munn & Co
attorneys

UNITED STATES PATENT OFFICE.

ASAHEL J. SEVERANCE, OF MIDDLEBURY, VERMONT, ASSIGNEE, BY MESNE ASSIGNMENTS, OF RODOLPHE LESCHOT.

*Letters Patent No.* 39,235, *dated July* 14, 1863; *reissue No.* 3,304, *dated February* 16, 1869; *reissue No.* 3,690, *dated October* 26, 1869.

IMPROVED ROCK-DRILL.

The Schedule referred to in these Letters Patent and making part of the same

Be it known that RODOLPHE LESCHOT, of Paris, in the Empire of France, has invented a new and improved Drill, or Tool for the Boring of Rocks and other hard substances; and I, ASAHEL J. SEVERANCE, of Middlebury, in the State of Vermont, assignee of said invention, do hereby declare the following to be a full, clear, and exact description of the same, reference being had to the accompanying drawings, forming a part of this specification, in which—

Similar letters of reference indicate corresponding parts in all the figures.

Figure 1:
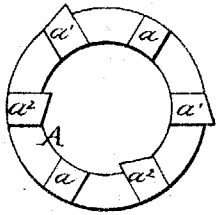
Figure 1 is a front view of the crown or boring-head.
Figure 2:
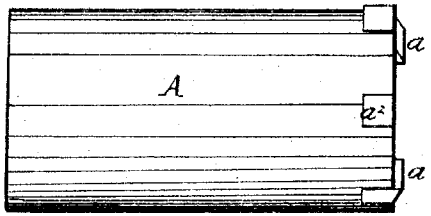
Figure 2 is a side view of the same.

Heretofore the boring or drilling of rocks has been generally accomplished by means of a chisel, punch, or boring-bar, operated by percussion.

This invention consists in a boring-tool composed of a series of diamond edges, attached to an annular or tubular stock or crown, of steel or other metal, to which a rotary and a direct forward motion are given, and which is thereby caused to cut or bore an annular groove or hole, leaving a central core or kernel, which is easily detached by the subsequent operation of a gad or wedge.

It also consists in the combination, with the described boring-tool, of a tubular boring-bar or drill-rod, whereby motion is imparted to the boring-head, and through which a stream of water is forced, as hereinafter set forth.

The quantity of matter required to be removed by such boring-tool is very small in proportion to the cavity which is formed after the withdrawal of the said kernel or core.

The advantage of this boring-tool is that it may be operated with a small amount of power, is expeditious in its action, and its wear is almost imperceptible in operating upon the hardest substances.

To enable others skilled in the art to make and use my invention, I will proceed to describe it with reference to the drawing.

A is the annular or tubular socket or crown, of steel or other metal.

$a$ $a^1$ $a^2$ are edged cutters, composed of diamonds fitted and set firmly into suitable notches or mortises in the face of the crown or stock A. These diamonds are such as, from their color, are least valuable for jewelry.

They are respectively so arranged in the crown or stock A, that the cutting-edges of some project in a forward direction from the face or front end of the said crown or stock, as illustrated by $a$ $a$, while the edges of others project outwardly from the outward periphery thereof, as illustrated by $a^1$ $a^1$, and the edges of others project inwardly from the inner periphery, as illustrated by $a^2$ $a^2$.

This crown or stock is secured by a bayonet-fastening, or other means, to a tubular boring-bar, of any suitable length, whose outer diameter is not greater than that of the said crown or stock, and whose inner diameter is not less than that of the said crown or stock, and this bar is arranged to form part of a machine of suitable construction, or otherwise furnished with suitable mechanical appliances, according to the nature of the work to be performed, by which it has imparted to it both a rotary and a direct forward or feeding-motion, whereby it is caused to cut or bore an annular groove or hole in the rock or other hard body upon which it is employed.

The operation of the tool will be greatly assisted by the injection of a stream of water through the tubular boring-bar and crown or stock, for the purpose of washing out and carrying away the detritus which is produced, and which would otherwise choke up the annular opening, and impede the action of the tool.

This stream may be thrown in by a pump, connected by a hose with the outer or rear end of the tubular boring-bar, or by any other suitable and convenient means.

When the boring has been continued to a desirable depth, the bar with the attached tool is drawn out from the hole, and the cylindrical kernel or core which has been left, and which, as the boring-operation has proceeded, has passed through the socket or stock, and into the tubular bar, is broken away by driving wedges or gads into the annular hole, and then pulled out, leaving a cylindrical hole, of a diameter equal to the circle described by the revolution of the edges of the diamond-cutters $a^1$ $a^1$.

The same kind of tool, made of suitable calibre, may be used for the production of solid cylinders, of stone or other hard substance, as well as for boring, the solid cylinder being formed in the same way as the kernel or core above described, with reference to the boring-operation.

Having thus fully described this invention,

What I claim as new, and desire to secure by Letters Patent, is—

1. A continuously-revolving and progressing boring-head, having projecting diamond points, in combination with a tubular boring-bar, substantially as and for the purposes specified.

2. The row of cutting-edges $a^1$, when attached to a revolving boring-head, so as to project beyond the circumference thereof, for the purposes specified.

3. In combination with a revolving and progressing boring-head, having cutting-points projecting beyond the periphery thereof, a hollow central drill-rod, through which water is forced or passed.

4. A series of cutting-edges, $a$ $a^1$ $a^2$, arranged in the face and upon the outer and inner peripheries, respectively, of a tubular or annular bit or boring-head, A, substantially as and for the purposes specified.

Witnesses: ASAHEL J. SEVERANCE.

WM. T. HOLT,

PHILO CHASE.